(12) United States Patent
Suzuki

(10) Patent No.: US 12,500,495 B2
(45) Date of Patent: Dec. 16, 2025

(54) COMPRESSOR

(71) Applicant: FUJITSU GENERAL LIMITED, Kanagawa (JP)

(72) Inventor: Takashi Suzuki, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 236 days.

(21) Appl. No.: 18/272,503

(22) PCT Filed: Sep. 22, 2021

(86) PCT No.: PCT/JP2021/034875
§ 371 (c)(1),
(2) Date: Jul. 14, 2023

(87) PCT Pub. No.: WO2022/163011
PCT Pub. Date: Aug. 4, 2022

(65) Prior Publication Data
US 2024/0072622 A1  Feb. 29, 2024

(30) Foreign Application Priority Data
Jan. 29, 2021  (JP) .................... 2021-013716

(51) Int. Cl.
*H02K 7/04*  (2006.01)
*F04C 18/02*  (2006.01)
*H02K 1/27*  (2022.01)
*H02K 15/165*  (2025.01)

(52) U.S. Cl.
CPC ....... *H02K 15/165* (2013.01); *F04C 18/0215* (2013.01)

(58) Field of Classification Search
CPC .. H02K 7/04; H02K 7/14; H02K 1/06; H02K 1/22; H02K 15/16; H02K 15/165; F04C 18/0215
See application file for complete search history.

(56) References Cited

U.S. PATENT DOCUMENTS

2016/0294251 A1* 10/2016 Fukasaku ............... F04C 23/02
2018/0031280 A1  2/2018 Kobayashi et al.

FOREIGN PATENT DOCUMENTS

| CN | 204304643 U * | 4/2015 | ............ H02K 7/04 |
| JP | H04-112652 A | 4/1992 | |
| JP | H04-344153 A | 11/1992 | |

(Continued)

*Primary Examiner* — Tran N Nguyen
(74) *Attorney, Agent, or Firm* — Paratus Law Group, PLLC

(57) ABSTRACT

A compressor includes a rotor core, a stator configured to rotate the rotor core about a rotational axis, and a compressing unit that is driven as the rotor core is rotated, wherein the rotor core includes a stack of a plurality of core sheets, each core sheet of the core sheets has a balancing hole by which a center of a mass of the core sheet is offset in a radial direction from the rotational axis, the rotor core includes an eccentric portion and an eccentricity alleviating portion, the center of a mass of the eccentric portion is offset in the radial direction from the rotational axis, and in the eccentricity alleviating portion, the eccentricity of the balancing holes of some of the core sheets is canceled out by the eccentricity of the balancing holes of others of the core sheets.

7 Claims, 7 Drawing Sheets

(56) References Cited

FOREIGN PATENT DOCUMENTS

| JP | H05-088164 U | 11/1993 |
| JP | H09-084285 A | 3/1997 |
| JP | 2003-219616 A | 7/2003 |
| JP | 2018-017201 A | 2/2018 |

* cited by examiner

«COMPRESSOR»

COMPRESSOR

CROSS REFERENCE TO PRIOR APPLICATION

This application is a National Stage Patent Application of PCT International Patent Application No. PCT/JP2021/034875 (filed on Sep. 22, 2021) under 35 U.S.C. § 371, which claims priority to Japanese Patent Application No. 2021-013716 (filed on Jan. 29, 2021), which are all hereby incorporated by reference in their entirety.

FIELD

The present invention relates to a compressor.

BACKGROUND

Known is a compressor including a motor with a rotor core provided with balancing holes at appropriate positions and having an appropriate depth, to suppress inconveniences such as vibration resultant of an unbalanced mass distribution of a rotating body (see Patent Literature 1 to Patent Literature 4). Because the rotor core of such a compressor is not provided with separate balancing weights, such a compressor can not only reduce a manufacturing cost, but also suppress a reduction in the compression efficiency due to the refrigerant being stirred inside the compressor housing.

CITATION LIST

Patent Literature

Patent Literature 1: Japanese Patent Application Laid-open No. H04-112652
Patent Literature 2: Japanese Patent Application Laid-open No. H09-84285
Patent Literature 3: Japanese Patent Applicator Laid-open No. 2003-219616
Patent Literature 4: Japanese Patent Application Laid-open No. 2018-17201

SUMMARY

Technical Problem

A rotor core is fabricated as a stack of a plurality of core sheets each of which is a steel sheet that is a magnetic body. The balancing holes are formed by stacking the core sheets appropriately in such a manner that penetrating holes provided to the core sheets are connected. The core sheets include a plurality of types of core sheets the shapes of which are different. The core sheets are fabricated by punching with a press machine. The different types of core sheets are manufactured by changing the die of the press machine to those or a plurality of types. Therefore, as the number of the types of core sheets to be manufactured increases, the die control for switching the dies becomes more complicated, disadvantageously.

The technology disclosed herein is made in consideration of the above, and an object of the present invention is to provide a compressor that simplifies manufacturing of a rotor core having balancing holes.

Solution to Problem

According to an aspect of an embodiment, a compressor includes a shaft that is: disposed along a rotational axis, a rotor core that is fixed to the shaft, a stator configured to rotate the rotor core about the rotational axis, and a compressing unit that is driven as the shaft is rotated, wherein the rotor core includes a stack of a plurality of core sheets, each core sheet of the plurality of core sheets has a balancing hole by which a center of a mass of the core sheet is offset in a radial direction about the rotational axis, the rotor core includes an eccentric portion and an eccentricity alleviating portion, the eccentric portion has eccentricity in which a center of a mass of the eccentric portion is offset in the radial direction, being offset by a plurality of the balancing holes connected in an axial direction that is in parallel with the rotational axis, and in the eccentricity alleviating portion, the eccentricity resultant of the balancing holes of the plurality of core sheets is canceled out by eccentricity of the balancing holes of others of the plurality of core sheets.

Advantageous Effects of Invention

The compressor disclosed herein can simplify manufacturing of a rotor core having balancing holes.

DESCRIPTION OF EMBODIMENTS

Compressors according to some embodiments disclosed in the present application will now be described with reference to the drawings. The technology disclosed in the present application is not limited by the following description. In the following description, identical components are denoted by the same reference signs, and redundant explanations thereof will be omitted.

First Embodiment

Figure 1:
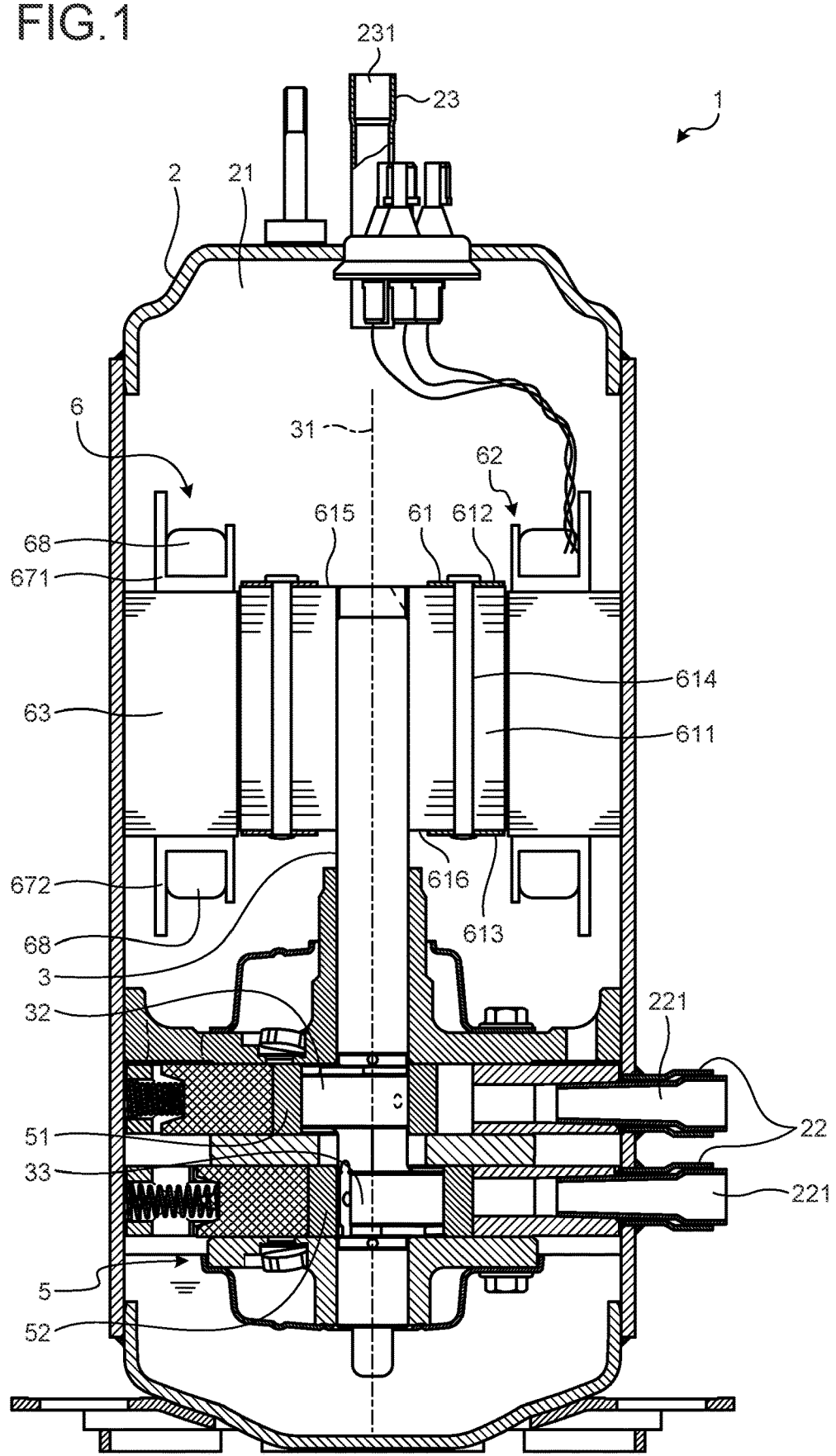
FIG. 1 is a longitudinal sectional view illustrating a compressor of a first embodiment.

A compressor 1 of a first embodiment includes a container 2, a shaft 3, a compressing unit 5, and a motor unit 6, as illustrated in FIG. 1. FIG. 1 is a longitudinal sectional view illustrating the compressor 1 of the first embodiment. The container 2 has a sealed internal space 21. The internal space 21 has a substantially cylindrical shape. The container 2 has such a shape that the central axis of the cylindrical internal space 21 extends in parallel with a vertical direction when the container 2 is placed longitudinally on a horizontal surface. The container 2 includes suction pipes 22 and a discharge pipe 23. Each of the suction pipe 22 has an internal flow channel 221. The suction pipes 22 are joined to the container 2 in such a manner that the flow channels 221 are connected to a lower part of the internal space 21. The discharge pipe 23 has an internal flow channel 231. The discharge pipe 23 is joined to the container 2 in such a manner that the flow channel 231 is connected to an upper part of the internal space 21.

The shaft 3 has a rod-like shape. The shaft 3 is disposed inside the internal space 21 along a rotational axis 31, concentrically with the central axis of the cylinder delineated by the internal space 21, and supported rotatably about the rotational axis 31 by she container 2. The shaft 3 includes a first eccentric portion 32 and a second eccentric portion 33. The first eccentric portion 32 and the second eccentric portion 33 are disposed inside the lower part of the internal space 21, and are fixed to the shaft 3. In other words, the first eccentric portion 32 and the second eccentric portion 33 are supported rotatably about the rotational axis 31, by the container 2 via the shaft 3.

The compressing unit 5 is disposed inside the lower part of the internal space 21, in a manner surrounding the first eccentric portion 32 and the second eccentric portion 33 of the shaft 3. The compressing unit 5 is what is called a rotary compressor mechanism, and includes a first annular piston 51 and a second annular piston 52. The first annular piston 51 is in engagement with the first eccentric portion 32, and is revolved as the shaft 3 is rotated. The second annular piston 52 is in engagement with the second eccentric portion 33, and is revolved as the shaft 3 is rotated. The revolving first annular piston 51 and second annular piston 52 cause the compressing unit 5 to compress the refrigerant supplied through the suction pipes 22, and to supply the compressed refrigerant into a part of the internal space 21 above the compressing unit 5. Without limitation to a rotary compressor mechanism, the compressing unit 5 may also be a scroll compressor mechanism.

The motor unit 6 is disposed inside a part of the internal space 21 above the compressing unit 5. The motor unit 6 includes a rotor 61 and a stator 62. The rotor 61 includes a rotor core 611, a top end plate 612, a bottom end plate 613, and a plurality of rivets 614. The rotor core 611 has a substantially cylindrical shape. The central axis of the cylindrical rotor core 611 is disposed concentrically with the rotational axis 31, and is fixed to the shaft 3. In other words, the rotor core 611 is supported rotatably about the rotational axis 31, by the container 2 via the shaft 3. The top end plate 612 has a substantially disk-like shape, and is disposed covering a top end surface 615 of the rotor core 611. The bottom end plate 613 has a substantially disk-like shape, and is disposed covering a bottom end surface 616 of the rotor core 611. Each of the rivets 614 is a magnetic body, and has a rod-like shape. The rivets 614 penetrate the rotor core 611 in an up-down direction that is in parallel with the rotational axis 31, and fix the top end plate 612 and the bottom end plate 613 to the rotor core 611.

The stator 62 has a substantially circular tubular shape. The stator 62 is disposed inside the internal space 21 in a manner surrounding the rotor 61 having a cylindrical shape, more specifically, in such a manner that the central axis of the rotor 61 extends concentrically with the central axis of the stator 62, and is fixed to the container 2. The stator 62 includes a stator core 63, an upper insulator 671, a lower insulator 672, and a plurality of windings 66.

Figure 2:
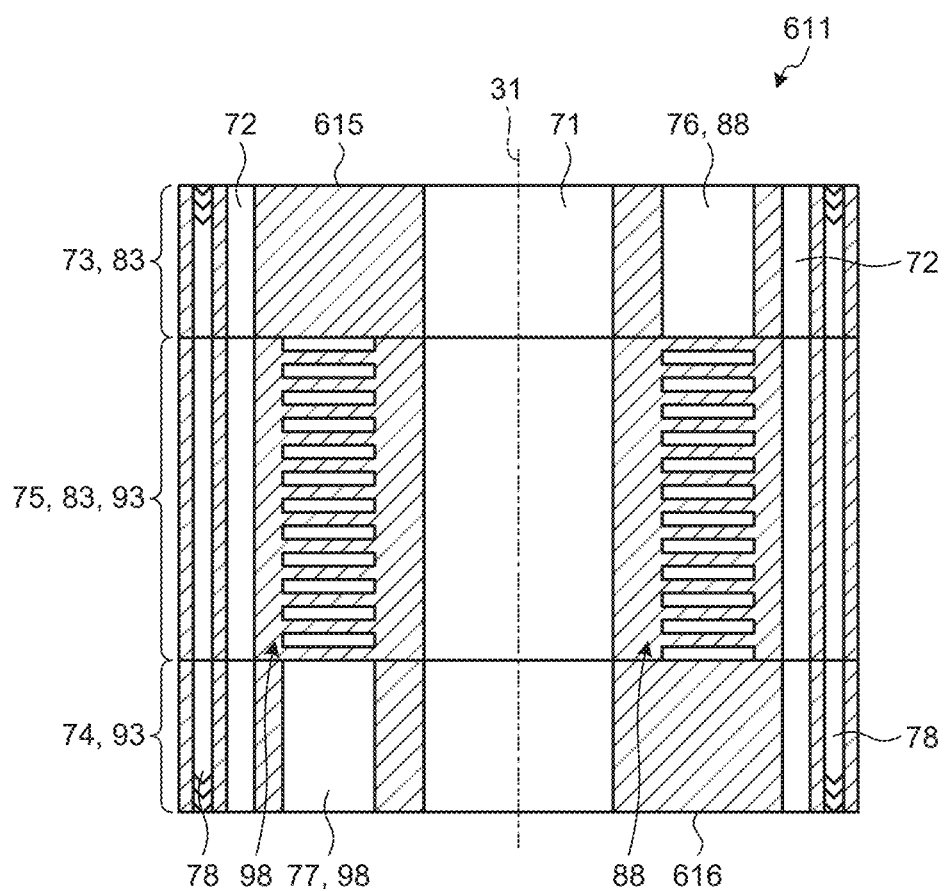
FIG. 2 is a sectional view illustrating a rotor core of the compressor of the first embodiment.

FIG. 2 is a sectional view illustrating the rotor core 611 of the compressor 1 of the first embodiment. The rotor core 611 also has a shaft hole 71 and a plurality of magnet holes 72. The shaft hole 71 is provided in a manner extending along the rotational axis 31, and in a manner penetrating the top end surface 615 and the bottom end surface 616 of the rotor core 611.

The magnet holes 72 are provided in a manner extending along a plurality of respective lines that are in parallel with the rotational axis 31, and in a manner penetrating the top end surface 615 and the bottom end surface 616 of the rotor core 611. The rotor 61 further includes a plurality of permanent magnets, not illustrated. The permanent magnets are fitted into the respective magnet holes 72, and are disposed inside the respective magnet holes 72. With the cop end plate 612 and the bottom end plate 613 fixed to the rotor core 611, the permanent magnets are fixed to the rotor core 611 so that the permanent magnets do not come out of the respective magnet holes 72.

The rotor core 611 includes a first eccentric portion 73, a second eccentric portion 74, and an eccentricity alleviating portion 75. The first eccentric portion 73 is a part of the rotor core 611 near the top end surface 615. In other words, the first eccentric portion 73 forms the top end surface 615 of the rotor core 611. The first eccentric portion 73 may have any length in the axial direction that is in parallel with the rotational axis 31, but in the explanation herein, one fourth the length of the rotor core 611 in the axial direction. The second eccentric portion 74 is a part of the rotor core 611 near the bottom end surface 616. In other words, the second eccentric portion 74 forms the bottom end surface 616 of the rotor core 611. The length of the second eccentric portion 74 in the axial direction is equal to the length of the first eccentric portion 73 in the axial direction, that is, one fourth the length of the rotor core 611 in the axial direction. The eccentricity alleviating portion 75 is disposed between the first eccentric portion 73 and the second eccentric portion 74, and is sandwiched between the first eccentric portion 73 and the second eccentric portion 74. The length of the eccentricity alleviating portion 75 in the axial direction is half the length of the rotor core 611 in the axial direction.

The rotor core 611 also has a plurality of top-end-side balancing holes 76 and a plurality of bottom-end-side balancing holes 77. The top-end-side balancing holes 76 are provided on one side of the rotational axis 31. The top-end-side balancing holes 76 are provided extending along lines in parallel with the rotational axis 31, and penetrating the first eccentric portion 73 of the rotor core 611. In other words, each of the top-end-side balancing holes 76 is provided as a bottomed hole recessed from the top end surface 615. The too-end-side balancing holes 76 have their openings on the top end surface 615, and the eccentricity alleviating portion 75 provides the bottom of the top-end-side balancing holes 76. The depth of the top-end-side balancing holes 76 is equal to the length of the first eccentric portion 73 in the axial direction, and, in the example explained herein, is one fourth the length of the rotor core 611 in the axial direction.

The bottom-end-side balancing holes 77 are provided on the other side of the rotational axis 31, and are provided on the side opposite to where the top-end-side balancing holes 76 are provided, with respect to the rotational axis 31. The bottom-end-side balancing holes 77 are provided extending along lines that are in parallel with the rotational axis 31, and penetrating the second eccentric portion 74 of the rotor core 611. In other words, each of the bottom-end-side balancing holes 77 is provided as a bottomed hole recessed from the bottom end surface 616. The bottom-end-side balancing holes 77 have their openings on the bottom end surface 616, and the eccentricity alleviating portion 75 provides the bottom of the respective top-end-side balancing holes 77. The depth of the bottom-end-side balancing holes 7 may be any depth, but in the example explained in this embodiment, is equal to the depth of the top-end-side balancing holes 76, that is, one fourth the length of the rotor core 611 in the axial direction.

The rotor core 611 includes a plurality of core sheets. The core sheets are stacked in a manner aligned in the axial direction, and in parallel with a plane perpendicular to the rotational axis 31. The rotor core 611 includes a plurality of crimp portions 78, Each of the crimp portions 78 extends in parallel with the rotational axis 31. The core sheets are fixed by the crimp portions 78 so that adjacent pairs of the core sheets do not separate from each other. In other words, the rotor core 611 includes a stack of the core sheets that are fixed by the crimp portions 78 that are aligned in the axial direction.

Figure 3:
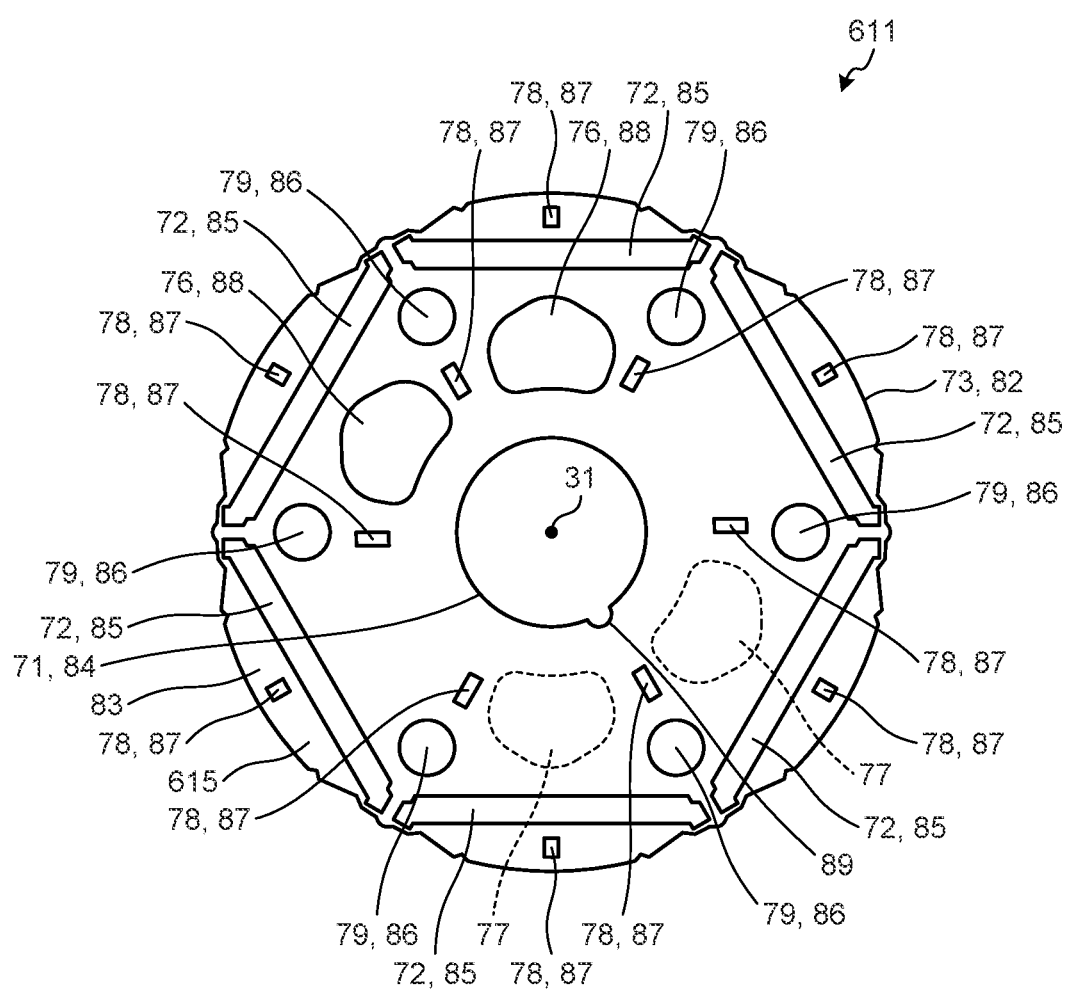
FIG. 3 is a plan view illustrating the rotator core of the compressor of the first embodiment.

FIG. 3 is a top view illustrating the rotor core 611 of the compressor 1 of the first embodiment. The shaft hole 71 has a substantially cylindrical shape, and a side wall (inner circumferential surface) of the shaft hole 71 is provided extending along the outer circumferential surface of the shaft 3. The shaft hole 71 is provided at the center of the rotor core 611 so that the central axis of the shaft hole 71 is concentric with the rotational axis 31. The shaft 3 is inserted into the shaft hole 71, and is fixed to the rotor core 61i1. The magnet holes 72 are disposed surrounding the shaft hole 71. In other words, the permanent magnets are embedded in the rotor core 611, in a manner surrounding the shaft hole 71. The crimp portions 78 are disposed surrounding the shaft hole 71.

The top-end-side balancing holes 76 are positioned on the top-end side of the shaft hole 71 (on the side of one end of an axial direction that is in parallel with the rotational axis 31). The top-end-side balancing holes 76 are also provided at unbalanced positions, in a cross section perpendicular to the rotational axis 31, on one side of a circumference around the rotational axis 31. The bottom-end-side balancing holes 77 are positioned on the bottom-end side in the axial direction that is in parallel with the rotational axis 31, on the side opposite to the top-end-side balancing holes 76 (the side on the other end of the axial direction that is in parallel with the rotational axis 31). The bottom-end-side balancing holes 77 are also provided on the other side of the circumference around the rotational axis 31, in a cross section perpendicular to the rotational axis 31.

The rotor core 611 further includes a plurality of rivet holes 79. The rivet holes 79 extend in parallel with the rotational axis 31. The rivet holes 79 are provided on the side nearer to the shaft hole 71 than the magnet holes 72, at positions surrounding the shaft hole 71. The rivets 614 are inserted into the respective rivet holes 79. Each of the rivets 614 has both ends crimped so that the rivet 614 does not come out of the corresponding rivet hole 79. With the rivets 614 having their both ends crimped, the top end plate 612 and the bottom end plate 613 are fixed to the rotor core 611.

The core sheets forming the rotor core 611 include a plurality of first core sheets 83. Each of the first core sheets 83 is a steel sheet that is a magnetic body, and has a substantially disk-like shape. The first core sheet 83 has a first shaft hole 84, a plurality of first magnet holes 85, a plurality of first rivet holes 86, and a plurality of first crimp portions 87. The first shaft hole 84, the first magnet holes 85, and the first rivet holes 86 are provided as holes penetrating the front and the rear sides of the first core sheet 83, The first shaft hole 84 has a circular shape, and is provided at the center of the first core sheet 83. The first magnet holes 85 are disposed surrounding the first shaft hole 84. The first rivet holes 86 are disposed surrounding the first shaft hole 84. Each of the first crimp portions 87 is recessed from a surface of the first core sheet 83, on the side near the top end surface 615, and protrudes from a surface of the first core sheet 83 on the side near the bottom end surface 616. The first crimp portions 87 are disposed surrounding the first shaft hole 84.

The first core sheet 83 also has first balancing holes 88 and a first cutout 89. The first balancing holes 8 are provided as holes penetrating the front and the rear sides of the first core sheet 83. The first balancing holes 88 are provided at unbalanced positions along the circumferential direction about the rotational axis 31, so that the center of the mass of the first core sheet 83 is offset radially with respect to the rotational axis 31. The first cutout 89 is provided on the rim of the first shaft hole 84. The first core sheet 83 has no penetrating holes provided at portions axially overlapping with a plurality of respective bottom-end-side balancing holes 77 in the rotor core 611 (second balancing holes 98 on a plurality of second core sheets 93, which are described later).

The first eccentric portion 73 is provided as a continuous stack of the first core sheets 83. The first eccentric portion 73 has the top-end-side balancing holes 76 delineated by the first balancing holes 88 in the first core sheets 83, the first balancing holes 88 being aligned continuously and connected with one another in the axial direction. In other words, the top-end-side balancing holes 76 are defined by the first balancing holes 88 provided to the first core sheets 83.

Figure 4:
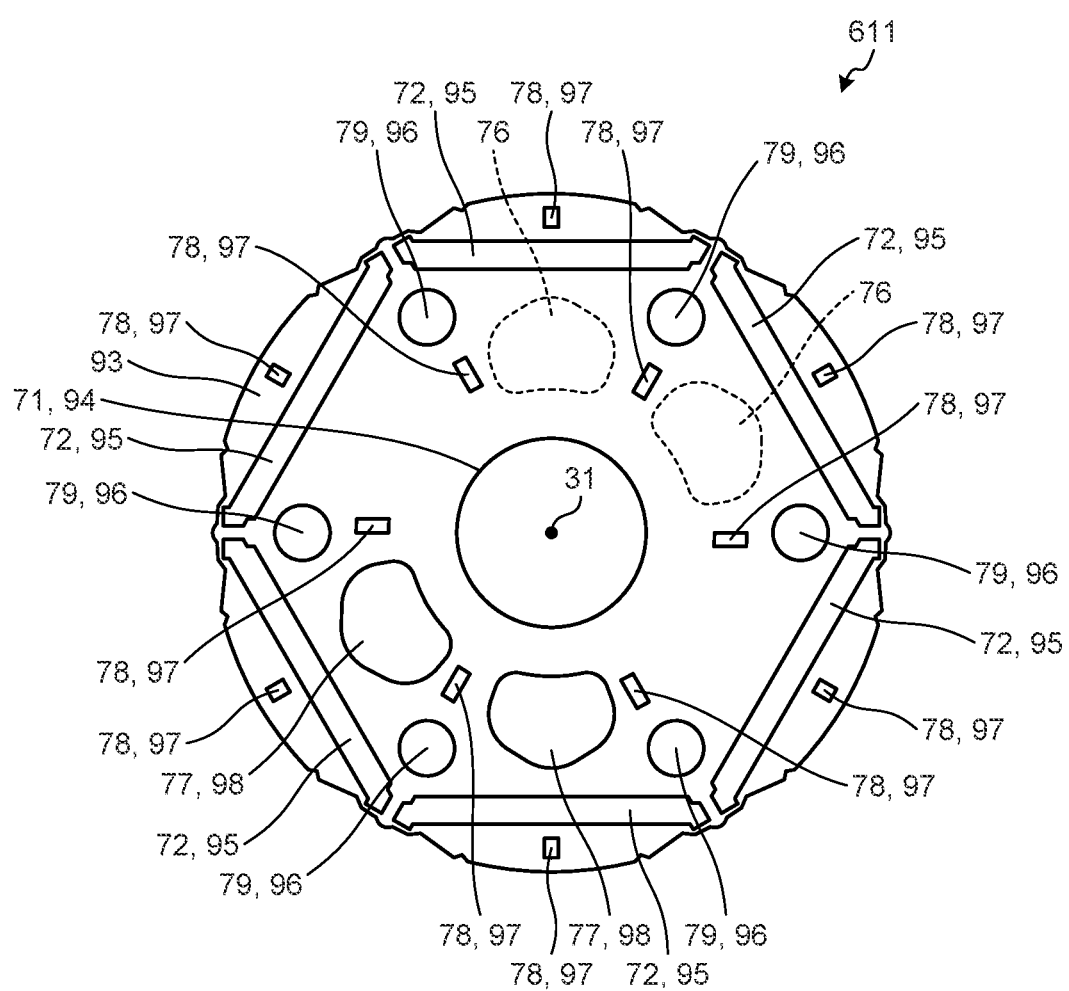
FIG. 4 is a plan view illustrating the rotator core of the compressor of the first embodiment.

FIG. 4 is a bottom view illustrating the rotor core 611 of the compressor 1 of the first embodiment. The core sheets forming the rotor core 611 further include a plurality of second core sheets 93. Each of the second core sheets 93 is a steel sheet that is a magnetic body, and has a substantially disk-like shape, in the same manner as the first core sheet 83. The second core sheet 93 has a second shaft hole 94, a plurality of second magnet holes 95, a plurality of second rivet holes 96, and a plurality of second crimp portions 97. The second shaft hole 94, the second magnet holes 95, and the second rivet holes 96 are provided as holes penetrating the front and the rear sides of the second core sheet 93. The second shaft hole 94 has a circular shape, and is provided at the center of the second core sheet 93. The second magnet holes 95 are disposed surrounding the second shaft hole 94. The second rivet holes 96 are disposed surrounding the second shaft hole 94. The second crimp portions 97 have the same configuration as that of the first crimp portions 87. Each of the second crimp portions 97 is recessed from a surface of the second core sheet 93, on the side near the top end surface 615, and protrudes from a surface of the second core sheet 93 on the side near the bottom end surface 616. The second crimp portions 97 are disposed surrounding the second shaft hole 94.

The second core sheet 93 also has second balancing holes 98. The second balancing holes 98 are provided as holes penetrating the front and the rear sides of the second core sheet 93. The second balancing holes 98 are provided at unbalanced positions along the circumferential direction about the rotational axis 31, so that the center of the mass of the second core sheet 93 is offset radially about the rotational axis 31. The first core sheets 83 and the second core sheets 93 are disposed so that, with the first core sheets 83 and the second core sheets 93 stacked as the rotor core 611, the center of the mass of the first core sheets 83 and the center of the mass of the second core sheets 93 are offset from each other, in the circumferential direction about the rotational axis 31. In this embodiment, the second core sheets 93 of the rotor core 611 have the second balancing holes 98 at positions offset by 180 degrees from the first balancing holes 88 of the first core sheets 83 in the circumferential direction about the rotational axis 31. The second core sheet 93 has no penetrating holes provided at portions axially overlapping with the top-end-side balancing holes 76, In this embodiment, no cutout is provided to the rim of the second shaft hole 94 of the second core sheets 93, but may also be provided to the rim of the second shaft hole 94. In such a case, the first core sheets 83 and the second core sheets 93 may have the same shape so that the second core sheets 93 overlap with the first core sheets 83 when the second core sheets 93 are rotated by 180 degrees about the rotational axis 31. With such a structure, a common die can be used to form the first core sheets 83 and the second core sheets 93.

The second eccentric portion 74 is provided as a continuous stack of the second core sheets 93. The bottom-end-side balancing holes 77 are delineated by the second balancing holes 98 of the second core sheets 93, which form the second eccentric portion 74, aligned continuously and connected with one another in the axial direction that is in parallel with the rotational axis 31. In other words, the bottom-end-side balancing holes 77 are defined by the second balancing holes 98 provided to the second core sheets 93.

The eccentricity alleviating portion 75 includes the first core sheets 83 and the second core sheets 93. In this embodiment, the eccentricity alleviating portion 75 includes the first core sheets 83 and the second core sheets 93 respective ones of which are stacked alternatingly. In other words, each of the first core sheets 83 has corresponding adjacent one of the second core sheets 93. Each of the second core sheets 93 has corresponding adjacent one of the first core sheets 83. Viewing the eccentricity alleviating portion 75 in the axial direction that is in parallel with the rotational axis 31, the first balancing holes 8P of the first core sheets 83 are positioned point-symmetrically about the rotational axis 31 with the second balancing holes 98 of the second core sheets 93, and respective ones of the first core sheets 83 and of the second core sheets 93 are disposed alternatingly, so that the mass is substantially point-symmetrically distributed around the rotational axis 31. In this configuration, because respective ones of the first core sheets 83 and of the second core sheets 93 are stacked alternatingly in the part of the rotor core 611 other than the first eccentric portion 73 and the second eccentric portion 74, that is, in the eccentricity alleviating portion 75, the eccentricity of the first balancing holes 88 of the first core sheets 83 in a direction causing the rotational axis 31 to incline is canceled (alleviated) by the eccentricity of the second balancing holes 98 of the second core sheets 93. In the same manner, the eccentricity of the second balancing holes 98 of the second core sheets 93 in the direction causing the rotational axis 31 to incline is canceled (alleviated) by the eccentricity of the first balancing holes 88 of the first core sheets 83 that are adjacent thereto. Therefore, the eccentricity alleviating portion 75 has almost no eccentricity about the rotational axis 31. Hence, in the rotor core 611, substantially only the first balancing holes 88 of the first core sheets 83 making up the first eccentric portion 73 and the second balancing holes 98 of the second core sheets 93 making up the second eccentric portion 741 function as the balancing holes for achieving the eccentricity of the rotor core 611 (the top-end-side balancing holes 76 and the bottom-end-side balancing holes 77).

The rotor core 611 is achieved by fixing the core sheets to one another using the crimp portions 78, to fix the first eccentric portion 73, the second eccentric portion 74, and the eccentricity alleviating portion 75 integrally. The first shaft hole 84 of every one of the first core sheets 83 and the second shaft hole 94 of every one of the second core sheets 93 are aligned and connected to each other in the axial direction, when the core sheets are stacked appropriately. In other words, the first shaft hole 84 provided to every one of the first core sheets 83 is connected to the second shaft hole 94 provided to every one of the second core sheets 93, and the shaft hole 71 is formed thereby.

Each of the first magnet holes 85 of every one of the first core sheets 83 and the corresponding second magnet hole 95 of every one of the second core sheets 93 are aligned in the axial direction and connected to each other, when the core sheets are stacked appropriately. In other words, each of the first magnet holes 85 provided to every one of the first core sheets 83 is connected to the corresponding second magnet hole 95 provided to every one of the second core sheets 93, and the magnet holes 72 are formed thereby.

Each of the first rivet holes 86 of every one of the first core sheets 83 and the corresponding second rivet hole 96 of every one of the second core sheets 93 are aligned in the axial direction and connected to each other, when the core sheets are stacked appropriately. In other words, each of the first rivet holes 86 provided to every one of the first core sheets 83 is connected to the corresponding second rivet hole 96 provided to every one of the second core sheets 93, and the rivet holes 79 are formed thereby.

Each of the first crimp portions 87 of every one of the first core sheets 83 and the corresponding second crimp portion 97 of every one of the second core sheets 93 are aligned in the axial direction and engaged with each other, when the core sheets are stacked appropriately. In other words, each of the first crimp portions 87 provided to every one of the first core sheets 83 is engaged with the corresponding second crimp portion 97 provided to every one of the second core sheets 93, and the crimp portions 78 are formed thereby.

[Operation of Compressor 1]

The compressor 1 is provided to a refrigeration cycle apparatus, not illustrated, and used in compressing the refrigerant and circulating the refrigerant through the refrigeration cycle apparatus. By applying a three-phased voltage to the windings 68 appropriately, the stator 62 in the motor unit 6 generates a rotating magnetic field in the space internal of the stator 62. The generated rotating magnetic field causes the rotor 61 to rotate about the rotational axis 31, rotating the shaft 3 about the rotational axis 31 thereby. With the shaft 3 rotating, the first eccentric portion 32 and the second eccentric portion 33 cause the first annular piston 51 and the second annular piston 52 to revolve.

With the first annular piston 51 and the second annular piston 52 revolving, the compressing unit 5 is caused to suction the low-pressure gas refrigerant through the suction pipes 22, and to compress the suctioned low-pressure gas refrigerant to generate high-pressure gas refrigerant. The generated high-pressure gas refrigerant is supplied into the space between the compressing unit 5 and the motor unit 6 inside the internal space 21. The high-pressure gas refrigerant supplied into the space between the compressing unit 5 and the motor unit 6 in the internal space 21 passes through a gap formed in the motor unit 6, and supplied into the space above the motor unit 6 in the internal space 21. The high-pressure gas refrigerant supplied into the space above the motor unit 6 in the internal space 21 is discharged to the discharge pipe 23, and further to an apparatus subsequent to the compressor in the refrigeration cycle apparatus.

In the compressor 1, the shaft 3, the first annular piston 51, the second annular piston 52, and the rotor 61 together form a rotating body rotating about the rotational axis 31. When the mass of the rotating body is not circumferentially distributed about the rotational axis 31 appropriately, the rotating body may cause the compressor 1 to vibrate severely as the rotating body rotates about the rotational axis 31. By setting the sizes of the top-end-side balancing holes 76 and the bottom-end-side balancing holes 77 of the rotor core 611 appropriately, it is possible to achieve a rotating body having its mass distributed appropriately symmetrically in the circumferential direction about the rotational axis 31. By distributing the mass of the elements of the rotating body appropriately symmetrically in the circumferential direction about the rotational axis 31, it is possible to reduce the vibration of the compressor 1. By not providing the rotor core 611 with any balancing weight for reducing the vibration, it is possible to achieve a compressor 1 in which the refrigerant is stirred less inside the internal space 21 due to the balancing weight, so that a deterioration of the compression efficiency can be suppressed.

[Method of Manufacturing Rotor Sore 611]

The rotor core 611 is fabricated using a press machine. The press machine includes a first die and a second die. The first die is used in fabricating each one of the first core sheets 83, and the press machine fabricates each one of the first core sheets 83 by punching a steel sheet with the first die. The second die is used in fabricating each one of the second core sheets 93, and the press machine fabricates each one of the second core sheets 93 by punching a steel sheet with the second die.

The press machine punches a steel sheet using one of the first die and the second die, one after another, to fabricate a core sheet at a time. For example, the press machine punches a steel sheet using the second die, one after another, to fabricate the second core sheets 93 by which the second eccentric portion 74 is made, one sheet at a time. After the second core sheets 93 for forming the second eccentric portion 71 are fabricated, the press machine punches a steel sheet by using the first die and the second die alternatingly, to fabricate the first core sheets 83 and the second core sheets 93 by which the eccentricity alleviating portion 75 is made, one sheet at a time. After the first core sheets 83 and the second core sheets 93 for forming the eccentricity alleviating portion 75 are fabricated, the press machine punches a steel sheet using the first die, one after another, to fabricate the first core sheets 83 by which the first eccentric portion 73 is made, one sheet at a time.

The press machine stacks a plurality of the fabricated core sheets in the axial direction, in the order in which the core sheets are fabricated. The press machine then compresses the stacked core sheets in the axial direction. As the core sheets are compressed, the first crimp portions 87 formed in one core sheet of two adjacent core sheets of the core sheets becomes engaged with the first crimp portions 87 formed in the other core sheet of the two adjacent core sheets, the second crimp portions 97 formed in the one core sheet becomes engaged with the second crimp portions 97 formed in the other core sheet, or the first crimp portions 87 formed in the one core sheet becomes engaged with the second crimp portions 97 formed in the other core sheet. With the pairs of the first crimp portions 87, the pairs of the second crimp portions 97, or the pairs of the first crimp portion 87 and the second crimp portion 97 in engagement, the stacked core sheets are fixed to one another, and the rotor core 611 is formed thereby. In other words, the press machine dies are controlled to switch the first die and the second die in such a manner the core sheets are fabricated in the same order in which the core sheets are arranged in the rotor core 611.

In the compressor 1, the rotor core 611 includes two kinds of core sheets that are the first core sheets 83 and the second core sheets 93. Therefore, the number of dies required in pressing can be reduced to two, so that the die control of the press machine can be simplified. When the first core sheets 83 and the second core sheets 93 have a common shape (e.g., when the first core sheet 83 circumferentially rotated by 180 degrees has the same shape as that of the second core sheets 93), it is possible to use a common die to form the first core sheet and to form the second core sheet.

[Compressor of Comparative Example]

Figure 5:
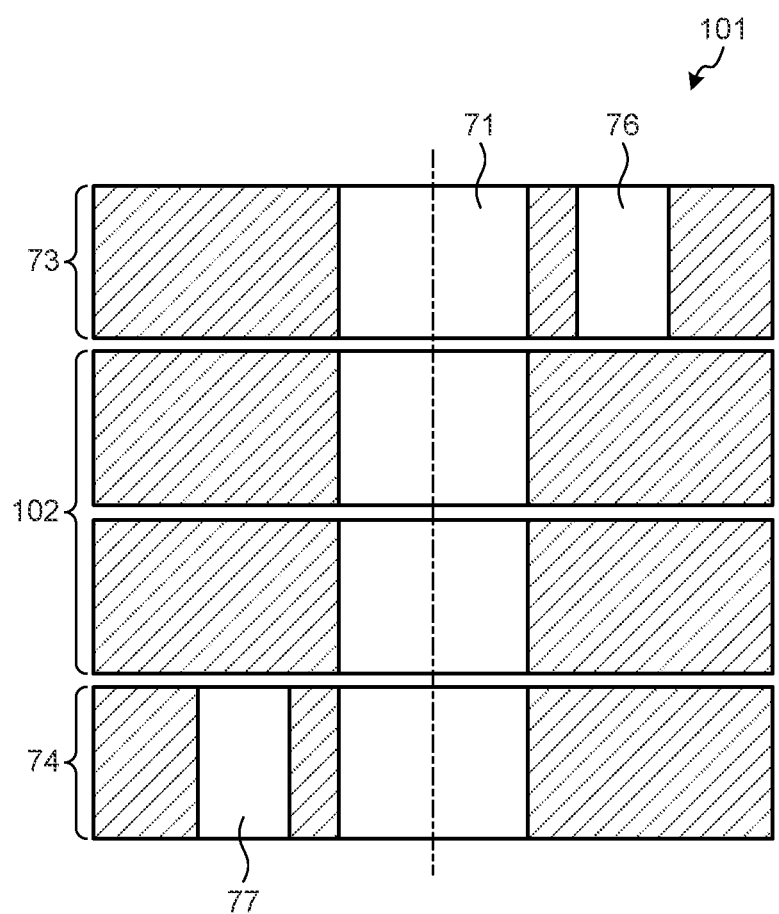
FIG. 5 is a schematic sectional view illustrating a rotor core of a compressor of a comparative example.

As illustrated in FIG. 5, a compressor of a comparative example includes, as a replacement of the rotor core 611 in the compressor 1 of the first embodiment described above, another rotor core 101, and remaining portions thereof are the same as those in the compressor 1 of the first embodiment described above. FIG. 5 is a schematic sectional view illustrating a rotor core 101 of a compressor of a comparative example. The rotor core 101 includes a non-eccentric portion 102, as a replacement of the eccentricity alleviating portion 75 of the rotor core 611 in the compressor 1 of the first embodiment described above. The non-eccentric portion 102 includes a plurality of non-eccentric core sheets. Each of the non-eccentric core sheets is the same as the first core sheet 83 or the second core sheet 93 described above but with the first balancing holes 88 and the first cutout 89 removed from the first core sheets 83 described above. In other words, each of the non-eccentric core sheets is a steel sheet that is a magnetic body, and has a substantially disk-like shape, in the same manner as the first core sheets 83 described above. Each of the non-eccentric core sheets has the first shaft hole 84, the first magnet holes 85, the first rivet holes 86, and the first crimp portions 87, in the same manner as the first core sheets 83 described above. The non-eccentric core sheets have no penetrating holes at portions axially overlapping with the top-end-side balancing hole 76 and the bottom-end-side balancing hole 77. In other words, the non-eccentric core sheet does not have any balancing holes for making the core sheet eccentric.

The non-eccentric portion 102 is provided as an axial stack of the non-eccentric core sheets, stacked in such a manner that the first shaft holes 84, the first magnet holes 85, the first rivet holes 86, and the first crimp portions 87 provided to the non-eccentric core sheets are respectively aligned in the axial direction. The rotor core 101 is formed by fixing each pair of the core sheets using the crimp portions 78, and by fixing the first eccentric portion 73, the second eccentric portion 74, the non-eccentric portion 102 integrally, in the same manner as in the rotor core 611.

The press machine also includes a third die used in fabricating a plurality of non-eccentric core sheets, when the rotor core 101 is fabricated. The press machine punches a steel sheet using one of the first die, the second die, and the third die, one after another, to fabricate a core sheet at a time. For example, the press machine punches a steel sheet using the second die, one after another, to fabricate the second core sheets by which the second eccentric portion 74 is made, one sheet at a time. After the second core sheets for making the second eccentric portion 74 are fabricated, the press machine punches a steel sheet using the third die, one after another, to fabricate the non-eccentric core sheets by which the non-eccentric portion 102 is made, one sheet at a time. After the non-eccentric core sheets are fabricated, the press machine punches a steel sheet using the first die, one after another, to fabricate the first core sheets for forming the first eccentric portion 73, one sheet at a time.

The press machine stacks the fabricated second core sheets, non-eccentric core sheets, and first core sheets in the axial direction, in the order in which the core sheets are fabricated, and compresses the stacked core sheets in the axial direction. As the core sheets are compressed, the first crimp portions 87 formed in one core sheet of two adjacent core sheets of the core sheets becomes engaged with the first crimp portions 87 formed in the other core sheet of the two adjacent core sheets, the second crimp portions 97 formed in the one core sheet becomes engaged with the second crimp portions 97 formed in the other core sheet, or the first crimp portions 87 formed in the one core sheet becomes engaged with the second crimp portions 97 formed in the other core sheet. With the pairs of the first crimp portions 87, the pairs of the second crimp portions 97, or the pairs of the first crimp portion 87 and the second crimp portion 97 in engagement, the stacked core sheets are fixed to one another, and the rotor core 101 is formed thereby.

In other words, when the rotor core 101 of the compressor of the comparative example is to be fabricated, the press machine is required to switch the dies of the three types. Therefore, the compressor 1 of the first embodiment can reduce the number of dies provided to the press machine, and can simplify the die control of the press machine, compared with that required for the compressor of the comparative example.

[Effects Achieved by Compressor 1 of First Embodiment]

The compressor 1 of the first embodiment includes the shaft 3, the rotor core 611, the stator 62, and the compressing unit 5. The shaft 3 is disposed along the rotational axis 31. The rotor core 611 is fixed to the shaft 3. The stator 62 causes the rotor core 611 to rotate about the rotational axis 31. The compressing unit 5 is driven as the shaft 3 is rotated. The rotor core 611 is provided as a stack of the core sheets 83, 93 (the first core sheets 83 and the second core sheets 93), Each of the core sheets 83, 93 has the balancing holes 88, 98 (the first balancing holes 88, the second balancing holes 98) for shifting the center of the mass of the core sheets 83, 93 off the center in the radial direction about the rotational axis 31. The rotor core 611 includes the first eccentric portion 73 and the eccentricity alleviating portion 75. The first eccentric portion 73 has radial eccentricity, with the first balancing holes 88 provided continuously to the first core sheets 83 along the axial direction that is in parallel with the rotational axis 31. In the eccentricity alleviating portion 75, the eccentricity of the first balancing holes 88 of the first core sheets 83 is canceled out by the eccentricity of the second balancing holes 98 provided to the other second core sheets 93.

In the compressor 1 of the first embodiment, by stacking the first core sheets 83 and the second core sheets 93 appropriately, the top-end-side balancing holes 76 and the bottom-end-side balancing holes 77 are formed in the rotor core 611. With the compressor 1, because the rotor core 611 has the balancing holes (the top-end-side balancing holes 76 and the bottom-end-side balancing holes 77), it is possible to distribute the mass of the elements making up the rotating body including the rotor core 611 appropriately, in the circumferential direction about the rotational axis 31, and to suppress the vibration caused by the rotation of the rotating body. Furthermore, in the compressor 1, the rotor core 611 includes the eccentric portions 73, 74 (the first eccentric portion 73 and the second eccentric portion 74), and the eccentricity alleviating portion 75. With the first balancing holes 88 provided continuously to the first core sheets 83 along the axial direction that is in parallel with the rotational axis 31, the center of the mass of the first eccentric portion 73 is offset from the center in the radial direction of the rotor core 611. In the eccentricity alleviating portion 75, the eccentricity of the first balancing holes 88 of the first core sheets 83 is canceled out by the eccentricity of the second balancing holes 98 of the second core sheets 93. In other words, by providing balancing holes to every core sheet included in the rotor core 611 (particularly, in the first embodiment, by setting the number of a plurality of types of core sheets for making the rotor core 611 to two including the first core sheets 83 and the second core sheets 93), the die specialized for manufacturing the core sheets without any balancing holes can be rendered unnecessary. Hence, the number of types of dies used in manufacturing the core sheets can be reduced. Because the number of types of dies used in manufacturing the core sheets is reduced, the compressor can simplify the die control of the press machine for fabricating the core sheets.

Furthermore, the rotor core 611 in the compressor 1 of the first embodiment includes the first eccentric portion 73, the second eccentric portion 74, and the eccentricity alleviating portion 75. The first eccentric portion 73 is provided as a stack of the first core sheets 83. The second eccentric portion 74 is provided as a stack of the second core sheets 93. The eccentricity alleviating portion 75 is disposed between the first eccentric portion 73 and the second eccentric portion 74. The eccentricity alleviating portion 75 includes the first core sheets 83 and the second core sheets 93 respective ones of which are stacked alternatingly.

In the compressor 1 of the first embodiment, by adjusting the length of toe first eccentric portion 73, the length of the second eccentric portion 74, and the length of the eccentricity alleviating portion 75 in the axial direction, the depth of the top-end-side balancing holes 76 and the depth of the bottom-end-side balancing holes 77 can be adjusted. With the compressor 1 of the first embodiment having the depth of the top-end-side balancing holes 76 and the depth of the bottom-end-side balancing holes 77 adjusted based on the eccentricity of the mass distribution of the shaft 3, the first annular piston 51, and the second annular piston 52, inconveniences such as vibrations can be suppressed, appropriately. Furthermore, even when there is a change in the length of the rotor core 611 in the axial direction (the thickness of the stack), for example, the amount the eccentricity can be adjusted in any way by changing the axial lengths or positions of the eccentric portions 73, 74 or the eccentricity alleviating portion 75, without changing the shape or the size of the balancing holes 88, 98 provided to the core sheets 83, 93.

Furthermore, each of the first core sheets 83 in the compressor of the first embodiment has the first shaft hole 84 through which the shaft 3 is passed. Each of the second core sheets 93 has the second shaft hole 94 through which the shaft 3 is passed. The first cutout 89 is provided on the rim of the first shaft hole 84 of the first core sheet. With this configuration, the compressor 1 enables an assembling worker or an inspector to make an observation on how the first cutouts 89 are aligned along the side wall of the shaft hole 71 in the rotor core 611 at the time of assembling the compressor 1. In this manner, even after the rotor core 611 is assembled, it is possible to check whether the top and the bottom of the rotor core 611 are correctly oriented, or whether the core sheets 83, 93 in the eccentricity alleviating portion 75 are arranged in the appropriate order, based on how the core sheets are stacked.

In the compressor 1 of the first embodiment, the second core sheet 93 may also have the same shape as the first core sheet 83 so that the second core sheet 93 overlaps with the first core sheet 83 when the second core sheet 93 is rotated about the rotational axis 31 by 180 degrees. In such a case, a cutout is also provided on the rim of the second shaft hole 94 of the second core sheet 93. Therefore, it is possible to use the first core sheet 83 rotated about the rotational axis 31 by 180 degrees as the second core sheets 93, and to use the die used in fabricating the first core sheet 83. At this time, although the press machine needs to rotate the die or the created core sheet as appropriate, the first core sheets 83 and the second core sheets 93 can be fabricated with a die of one type of shape. Therefore, die control can be simplified. Furthermore, it is possible to check whether the core sheets 83, 93 are arranged in the eccentricity alleviating portion 75 in an appropriate order, by observing how the cutouts 89 of the first core sheets and the cutouts of the second core sheets 93 are aligned on the side wall of the shaft hole 71.

In the eccentricity alleviating portion 75 of the compressor 1 of the first embodiment described above, respective ones of the first core sheets 83 and of the second core sheets 93 are stacked alternatingly, but predetermined numbers of the first core sheets 83 and of the second core sheets 93 may be stacked alternatingly, as will be disclosed in a second embodiment and a third embodiment.

Second Embodiment

Figure 6:
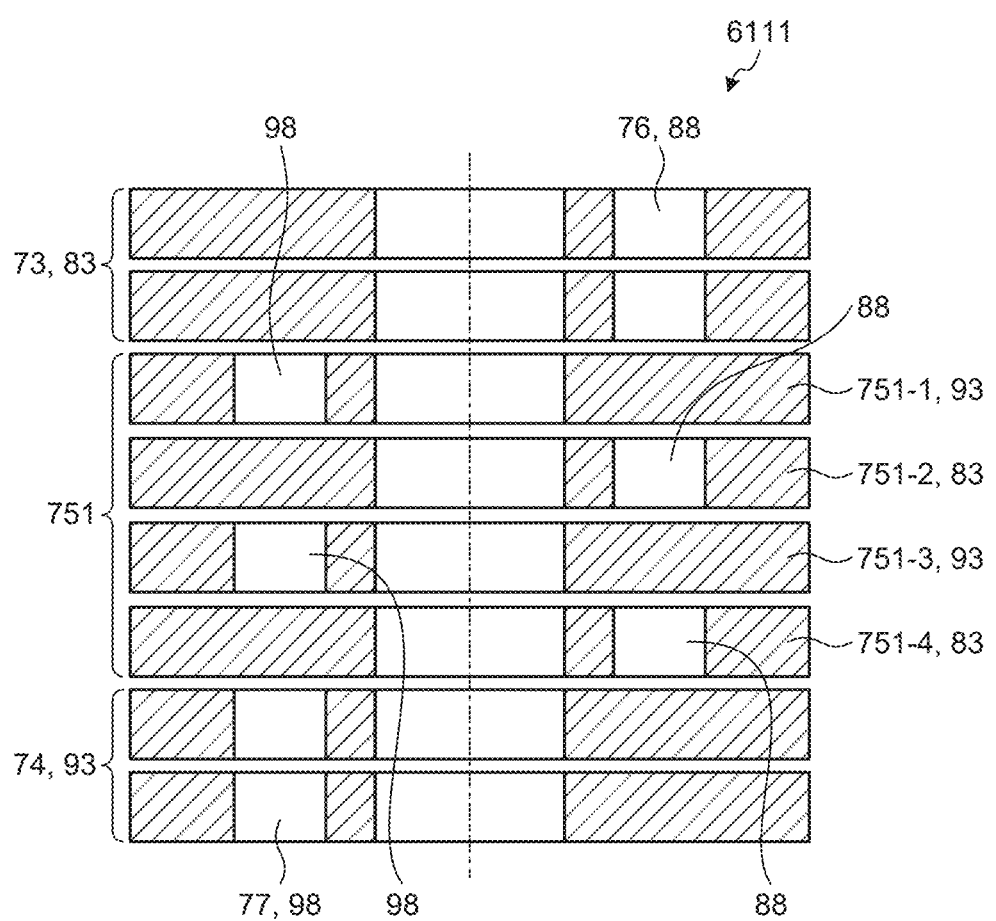
FIG. 6 is a schematic sectional view illustrating a rotor core of a compressor of a second embodiment.

As illustrated in FIG. 6, a compressor of a second embodiment includes, as a replacement of the rotor core 611 in the compressor 1 of the first embodiment described above, another rotor core 6111, and remaining portions thereof are the same as those in the compressor 1 of the first embodiment described above. FIG. 6 is a sectional view illustrating a rotor core 6111 of the compressor of the second embodiment. The rotor core 6111 includes another eccentricity alleviating portion 751, as a replacement of the eccentricity alleviating portico 75 of the rotor core 611 in the compressor 1 of the first embodiment described above. Tis eccentricity alleviating portion 751 is split into four quarters in the axial direction, and includes a first eccentricity alleviating portion 751-1, a second eccentricity alleviating portion 751-2, a third eccentricity alleviating portion 751-3, and a fourth eccentricity alleviating portion 751-4.

The first eccentricity alleviating portion 751-1 is disposed between the first eccentric portion 73 and the second eccentric portion 741, and is adjacent to the first eccentric portion 73. The length of the first eccentricity alleviating portion 751-1 in the axial direction may be any length, but explained herein is an example in which the length is substantially equal to one fourth the length of the eccentricity alleviating portion 751 in the axial direction. The first eccentricity alleviating portion 751-1 includes a stack of the second core sheets 93.

The second eccentricity alleviating portion 751-2 is disposed between the first eccentricity alleviating portion 751-1 and the second eccentric portion 74, and is adjacent to the first eccentricity alleviating portion 751-1. The length of the second eccentricity alleviating portion 751-2 in the axial direction is substantially equal to one fourth the length of the eccentricity alleviating portion 751 in the axial direction. The second eccentricity alleviating portion 751-2 includes a stack of the first core sheets 83.

The third eccentricity alleviating portion 751-3 is disposed between the second eccentricity alleviating portion 751-2 and the second eccentric portion 74, and is adjacent to the second eccentricity alleviating portion 751-2. The length of the third eccentricity alleviating portion 751-3 in the axial direction is substantially equal to one fourth the length of the eccentricity alleviating portion 751 in the axial direction. The third eccentricity alleviating portion 751-3 includes a stack or the second core sheets 93.

The fourth eccentricity alleviating portion 751-4 is disposed between the third eccentricity alleviating portion 751-3 and the second eccentric portion 74, and is adjacent to the third eccentricity alleviating portion 751-3 and the second eccentric portion 74. The length in the axial direction of the fourth eccentricity alleviating portion 751-4 is approximately equal to one fourth the length in the axial direction of the eccentricity alleviating portion 751. The fourth eccentricity alleviating portion 751-4 includes a stack or the first core sheets 83.

The eccentricity alleviating portion 751 includes the first eccentricity alleviating portion 751-1, the second eccentricity alleviating portion 751-2, the third eccentricity alleviating portion 751-3, and the fourth eccentricity alleviating portion 751-4 that are fixed to one another. The rotor core 6111 includes the first eccentric portion 73, the second eccentric portion 74, and the eccentricity alleviating portion 751 that are fixed to one another, in the same manner as the rotor core 611 described above.

Because the eccentricity alleviating portion 751 has such a shape, the mass is distributed point-symmetrically about the rotational axis 31. In other words, the second balancing holes 98 in the first eccentricity alleviating portion 751-1 are positioned point-symmetrically with the first balancing holes 88 in the second eccentricity alleviating portion 751-2, and the second balancing holes 98 in the third eccentricity alleviating portion 751-3 are positioned point-symmetrically with the first balancing holes 88 in the fourth eccentricity alleviating portion 751-4, both of which are positioned point-symmetrically about the rotational axis 31, in a view in the axial direction along the rotational axis 31. With this configuration, the eccentricity of the portion of the rotor core 6111 other than the first eccentric portion 73 and the second eccentric portion 74, that is, the eccentricity of the eccentricity alleviating portion 751 resultant of the balancing holes in a direction causing the rotational axis 31 to incline is canceled (alleviated) by the eccentricity of the adjacent balancing holes. Therefore, the eccentricity alleviating portion 751 has almost no eccentricity about the rotational axis 3, in the same manner as the eccentricity alleviating portion 75 described above. Hence, in the rotor core 6111 in the compressor of the second embodiment, substantially only the first balancing holes 88 of the first core sheets 83 making up the first eccentric portion 73 and the second balancing holes 98 of the second core sheets 93 making up the second eccentric portion 74 function as balancing holes (the top-end-side balancing holes 76, the bottom-end-side balancing holes 77) for achieving the eccentricity of the rotor core 6111, in the same manner as the rotor core 611 in the compressor 1 of the first embodiment described above. Therefore, with the compressor of the second embodiment, because the rotor core 6111 is made with the first core sheets 83 and the second core sheets 93, manufacturing of the rotor core 6111 can be simplified, in the same manner as the rotor core 611 described above.

Third Embodiment

Figure 7:
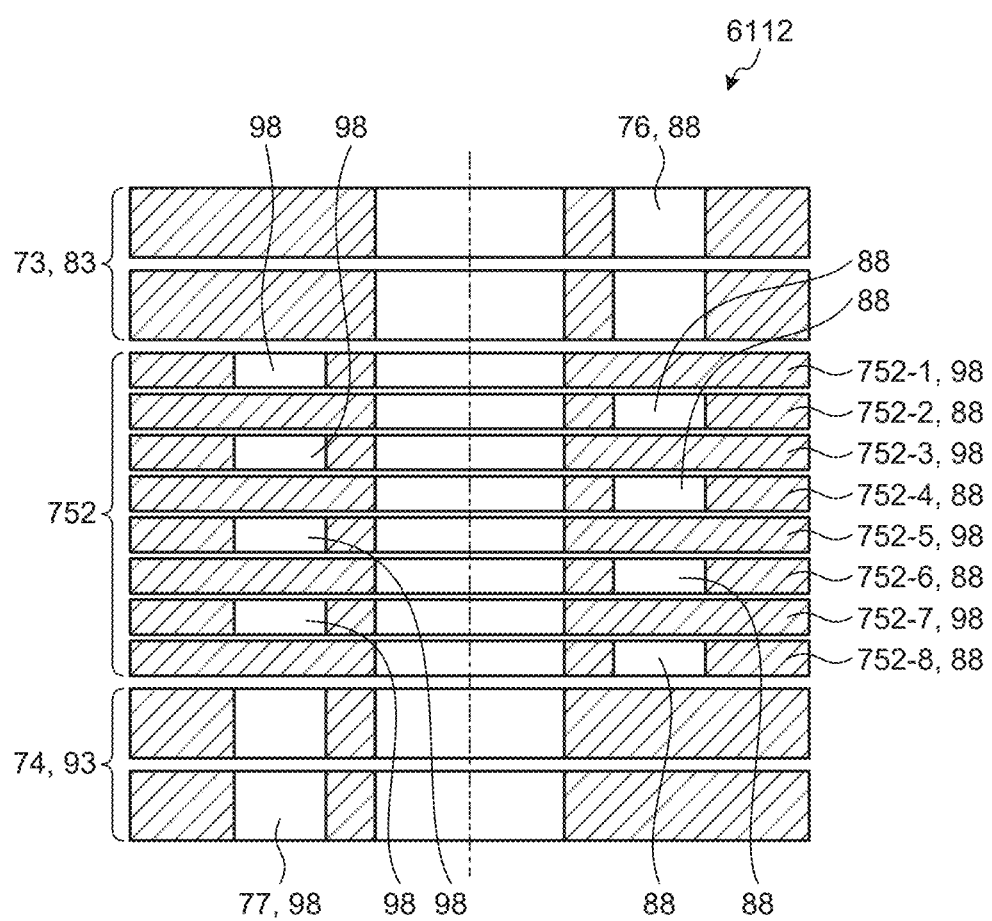
FIG. 7 is a sectional view illustrating a rotor core of a compressor of a third embodiment.

As illustrated in FIG. 7, a compressor or a third embodiment includes, as a replacement of the rotor core 611 in the compressor 1 of the first embodiment described above, another rotor core 6112, and remaining portions thereof are the same as those in the compressor of the first embodiment described above. FIG. 7 is a sectional view illustrating a rotor core 6112 included in the compressor of the third embodiment. The rotor core 6112 includes another eccentricity alleviating portion 752, as a replacement of the eccentricity alleviating portion 75 of the rotor core 611 in the compressor 1 of the first embodiment described above. The eccentricity alleviating portion 752 is divided into eight in the axial direction, and includes a first eccentricity alleviating portion 752-1 to an eighth eccentricity alleviating portion 752-8.

The first eccentricity alleviating portion 752-1 is disposed between the first eccentric portion 73 and the second eccentric portion 74, and is adjacent to the first eccentric portion 73. The length in the axial direct on of the first eccentricity alleviating portion 752-1 is approximately equal to one eighth of the length in the axial direction of the eccentricity alleviating portion 752. The first eccentricity alleviating portion 752-1 includes a stack of the second core sheets 93.

The second eccentricity alleviating portion 752-2 is disposed between the first eccentricity alleviating portion 752-1 and the second eccentric portion 74, and is adjacent to the first eccentricity alleviating portion 752-1. The length in the axial direction of the second eccentricity alleviation portion 752-2 is approximately equal to one eighth of the length in the axial direction of the eccentricity alleviating portion 752. The second eccentricity alleviating portion 752-2 includes a stack of the first core sheets 83.

The third eccentricity alleviating portion 752-3 is disposed between the second eccentricity alleviating portion 752-2 and the second eccentric portion 74, and is adjacent to the second eccentricity alleviating portion 752-2. The length in the axial direction of the third eccentricity alleviating portion 752-3 is approximately equal to one eighth of the length in the axial direction of the eccentricity alleviating portion 752. The third eccentricity alleviating portion 752-3 includes a stack of the second core sheets 93.

The fourth eccentricity alleviating portion 752-4 is disposed between the third eccentricity alleviating portion 752-3 and the second eccentric portion 74, and is adjacent to the third eccentricity alleviating portion 752-3. The length in the axial direction of the fourth eccentricity alleviating portion 752-4 is approximately equal to one eighth of the length in the axial direction of the eccentricity alleviating portion 752. The fourth eccentricity alleviating portion 752-4 includes a stack of the first core sheets 83.

The fifth eccentricity alleviating portion 752-5 is disposed between the fourth eccentricity alleviating portion 752-4 and the second eccentric portion 74, and is adjacent to the fourth eccentricity alleviating portion 752-4. The length in the axial direction of the fifth eccentricity alleviating portion 752-5 is approximately equal to one eighth of the length in the axial direction of the eccentricity alleviating portion 752. The fifth eccentricity alleviating portion 752-5 includes a stack of the second core sheets 93.

The sixth eccentricity alleviating portion 752-6 is disposed between the fifth eccentricity alleviating portion 752-5 and the second eccentric portion 74, and is adjacent to the fifth eccentricity alleviating portion 752-5. The length in the axial direction of the sixth eccentricity alleviating portion 752-6 is approximately equal to one eighth of the length in the axial direction of the eccentricity alleviating portion 752. The sixth eccentricity alleviating portion 752-6 includes a stack of the first core sheets 83.

The seventh eccentricity alleviating portion 752-7 is disposed between the sixth eccentricity alleviating portion 752-6 and the second eccentric portion 74, and is adjacent to the sixth eccentricity alleviating portion 752-6. The length in the axial direction of the seventh eccentricity alleviating portion 752-7 is approximately equal to one eighth of the length in the axial direction of the eccentricity alleviating portion 752. The seventh eccentricity alleviating portion 752-7 includes a stack of the second core sheets 93.

The eighth eccentricity alleviating portion 752-8 is disposed between the seventh eccentricity alleviating portion 752-7 and the second eccentric portion 74, and is adjacent to the seventh eccentricity alleviating portion 752-7 and the second eccentric portion 74. The length in the axial direction of the eighth eccentricity alleviating portion 752-8 is approximately equal to one eighth of the length in the axial direction of the eccentricity alleviating portion 752. The eighth eccentricity alleviating portion 752-8 includes a stack of the first core sheets 83.

The eccentricity alleviating portion 752 includes a first eccentricity alleviating portion 752-1 to an eighth eccentricity alleviating portion 752-8 that are fixed to one another. The rotor core 6112 includes the first eccentric portion 73, the second eccentric portion 74, and the eccentricity alleviating portion 752 that are fixed to one another, in the same manner as the rotor core 611 described above.

Because the eccentricity alleviating portion 752 has such a shape, the mass is distributed point-symmetrically with respect to the rotational axis 31. In other words, the first eccentricity alleviating portion 752-1 is positioned point-symmetrically with the second eccentricity alleviating portion 752-2; the third eccentricity alleviating portion 752-3 is positioned point-symmetrically with the fourth eccentricity alleviating portion 751-4; the fifth eccentricity alleviating portion 752-5 is positioned point-symmetrically with the sixth eccentricity alleviating portion 751-6; and the seventh eccentricity alleviating portion 752-7 is positioned point-symmetrically with the eighth eccentricity alleviating portion 751-8, all of which being positioned point-symmetrically about the rotational axis 31, in a view in the axial direction. With this configuration, the eccentricity of the portion of the rotor core 6112 other than the first eccentric portion 73 and the second eccentric portion 74, that is, the eccentricity of the eccentricity alleviating portion 752 resultant of the balancing holes in a direction causing the rotational axis 31 to incline is canceled (alleviated) by the eccentricity of the adjacent balancing holes. Therefore, the eccentricity alleviating portion 752 has almost no eccentricity about the rotational axis 31, in the same manner as the eccentricity alleviating portions 75, 751 described above. Hence, in the rotor core 6112 in the compressor of the third embodiment, substantially only the first balancing holes 88 of the first core sheets 83 making up the first eccentric portion 73 and the second balancing holes 98 of the second core sheets 93 making up the second eccentric portion 74 function as balancing holes (the top-end-side balancing holes 76, the bottom-end-side balancing holes 77) for achieving the eccentricity of the rotor core 6112, in the same manner as the rotor core 611 in the compressor 1 of the first embodiment or the rotor core 6111 in the compressor of the second embodiment described above. Therefore, with the compressor of the third embodiment, because the rotor core 6112 is made with the first core sheets 83 and the second core sheets 93, manufacturing of the rotor core 6112 can be simplified, in the same manner as the rotor cores 611, 6111 described above.

The first core sheet 83 has the same shape as the second core sheet 93 described above, except for the cutout, but may have a shape different from that of the second core sheet 93. For example, the first balancing holes 88 of the first core sheets 83 may have a shape different from that of the second balancing holes 98 of the second core sheets 93. In such a configuration, too, because the rotor core is made with the first core sheets 83 and the second core sheets 93, the compressor can simplify manufacturing of the rotor core 611.

The first core sheet 83 described above has the first cutout 89, but the first cutout 89 may also be omitted. Furthermore, the second core sheet 93 described above does not have any cutout corresponding to the first cutout 89 of the first core sheet 83, but may also have a corresponding cutout. In such a case, too, because the balancing holes are provided to each of the core sheets forming the rotor core 611, the compressor can simplify the fabrication of the core sheets, in the same manner as the compressor of the embodiments described above.

In the compressor of the embodiments described above, the depth of the top-end-side balancing holes 76 of the rotor core is equal to the depth of the bottom-end-side balancing holes 77, but may be different from the depth of the bottom-end-side balancing holes 77. In such a case, too, because the core sheets forming the rotor core include two types that are the first core sheets 83 and the second core sheets 93, the compressor can simplify the fabrication of the core sheets, in the same manner as the compressor of the embodiments described above.

In the compressor of the embodiments described above, each of the top-end-side balancing holes 76 is provided as a bottomed hole that is: recessed from the top end surface 615, but may be provided as a cavity provided internal of the rotor core. For example, the rotor core further includes a top-end-side eccentricity alleviating portion made in the same manner as the eccentricity alleviating portion 75. The top-end-side eccentricity alleviating portion is then disposed in such a manner that the first eccentric portion 73 is sandwiched between the top-end-side eccentricity alleviating portion and the eccentricity alleviating portion 75, and is fixed to the first eccentric portion 73. Furthermore, each of the bottom-end-side balancing holes 77 is provided as a hole that is recessed from the bottom end surface 616, but may also be provided as a cavity formed Internal of the rotor core. For example, the rotor core further includes a bottom-end-side eccentricity alleviating portion made in the same manner as the eccentricity alleviating portion 75. The bottom-end-side eccentricity alleviating portion is disposed in such a manner that the second eccentric portion 74 is sandwiched between the bottom-end-side eccentricity 5 alleviating portion and the eccentricity alleviating portion 75, and is fixed to the second eccentric portion 74. In such a configuration, too, because the rotor core is made with the first core sheets 83 and the second core sheets 93, the compressor can simplify manufacturing of the rotor core, in the same manner as the compressor of the embodiments described above.

In the compressor of the embodiments described above, the first eccentric portion 73 and the second eccentric portion 74 are provided only on the respective ends of the rotor core, but the first eccentric portion 73 or the second eccentric portion 74 may also be provided to a part of the eccentricity alleviating portion 75. In such a case, too, because the core sheets forming mg the rotor core include two types that are the first core sheets 83 and the second core sheets 93, the compressor can simplify the fabrication of the core sheets, in the same manner as the compressor of the embodiments described above.

Some embodiments have been described above, but the embodiments are not limited to those described above. Furthermore, the elements described above include those that can be easily thought of by those skilled in the art, those that are substantially identical, and those within the scope of what is called equivalence. Moreover, the elements described above may be combined as appropriate. Still furthermore, at least one of various omissions, replacements, and modifications of the elements may be made within the scope not deviating from the gist of the embodiments.

REFERENCE SIGNS LIST

1 COMPRESSOR
3 SHAFT
5 COMPRESSION UNIT
6 MOTOR
31 ROTATING SHAFT
61 ROTOR
62 STATOR
71 SHAFT HOLE
72 MAGNET BOLES
73 FIRST ECCENTRIC PORTION (ECCENTRIC PORTION)
74 SECOND ECCENTRIC PORTION (ECCENTRIC PORTION)
75 ECCENTRICITY ALLEVIATING PORTION
76 TOP-END-SIDE BALANCING HOLE
77 BOTTOM-END-SIDE BALANCING HOLE
83 FIRST CORE SHEET
84 FIRST SHAFT HOLE
88 FIRST BALANCING HOLE
89 FIRST CUTOUT
93 SECOND CORE SHEET
94 SECOND SHAFT HOLE
98 SECOND BALANCING HOLE
611 ROTOR CORE

The invention claimed is:

1. A compressor comprising:
a shaft that is disposed along a rotational axis;
a rotor core that is fixed to the shaft;
a stator configured to rotate the rotor core about the rotational axis; and
a compressing unit that is driven as the shaft is rotated, wherein
the rotor core includes a plurality of first core sheets and a plurality of second core sheets,
the plurality of first core sheets include a plurality of first balancing holes aligned in an axial direction parallel to the rotational axis, respectively,
the plurality of second cores sheets include a plurality of second balancing holes aligned in the axial direction, respectively,
the rotor core includes an eccentric portion and an eccentricity alleviating portion,
the eccentric portion consists of some first core sheets of the plurality of first core sheets and some second core sheets of the plurality of second core sheets, and includes some first balancing holes of the plurality of first balancing holes corresponding to the some first core sheets that are continuous in the axial direction and some second balancing holes of the plurality of second balancing holes corresponding to the some second core sheets that are continuous in the axial direction,
the eccentricity alleviating portion consists of remaining first core sheets of the plurality of first core sheets different from the some first core sheets, and remaining second core sheets of the plurality of second core sheets different from the some second core sheets, and
the plurality of first balancing holes are offset from the plurality of second balancing holes such that: a center of a mass of the plurality of first core sheets and a center of a mass of the plurality of second core sheets are offset from each other in a circumferential direction about the rotational axis; and eccentricity of remaining first balancing holes of the plurality of first balancing holes corresponding to the remaining first core sheets is canceled out by eccentricity of remaining second balancing holes of the plurality of second balancing holes corresponding to the remaining second core sheets.

2. The compressor according to claim 1, wherein the eccentricity alleviating portion includes a stack of the remaining first core sheets and the remaining second core sheets.

3. The compressor according to claim 1, wherein the plurality of first balancing holes and the plurality of second balancing holes are positioned offset from each other by 180 degrees in the circumferential direction about the rotational axis.

4. The compressor according to claim 1, wherein the remaining first core sheets and the remaining second core sheets are stacked alternatingly.

5. The compressor according to claim 1, wherein the eccentric portion includes:

a first eccentric portion including a stack of the some first core sheets provided on one end side in the axial direction; and a second eccentric portion including a stack of the some second core sheets provided on another end side in the axial direction; and the eccentricity alleviating portion is disposed between the first eccentric portion and the second eccentric portion in the axial direction.

6. The compressor according to claim 1, wherein each of the plurality of first core sheets has a first shaft hole through which the shaft is passed, each of the plurality of second core sheets has a second shaft hole through which the shaft is passed, and one of the first shaft hole or the second shaft hole has a cutout provided on a rim therein.

7. The compressor according to claim 1, wherein the plurality of first core sheets and the plurality of second core sheets have a same shape.

* * * * *